June 30, 1964     H. L. SCHEMENAUER     3,139,020
AIR CONDITIONING UNIT AND CONTROL MECHANISM THEREFOR
Filed April 26, 1961     2 Sheets-Sheet 1
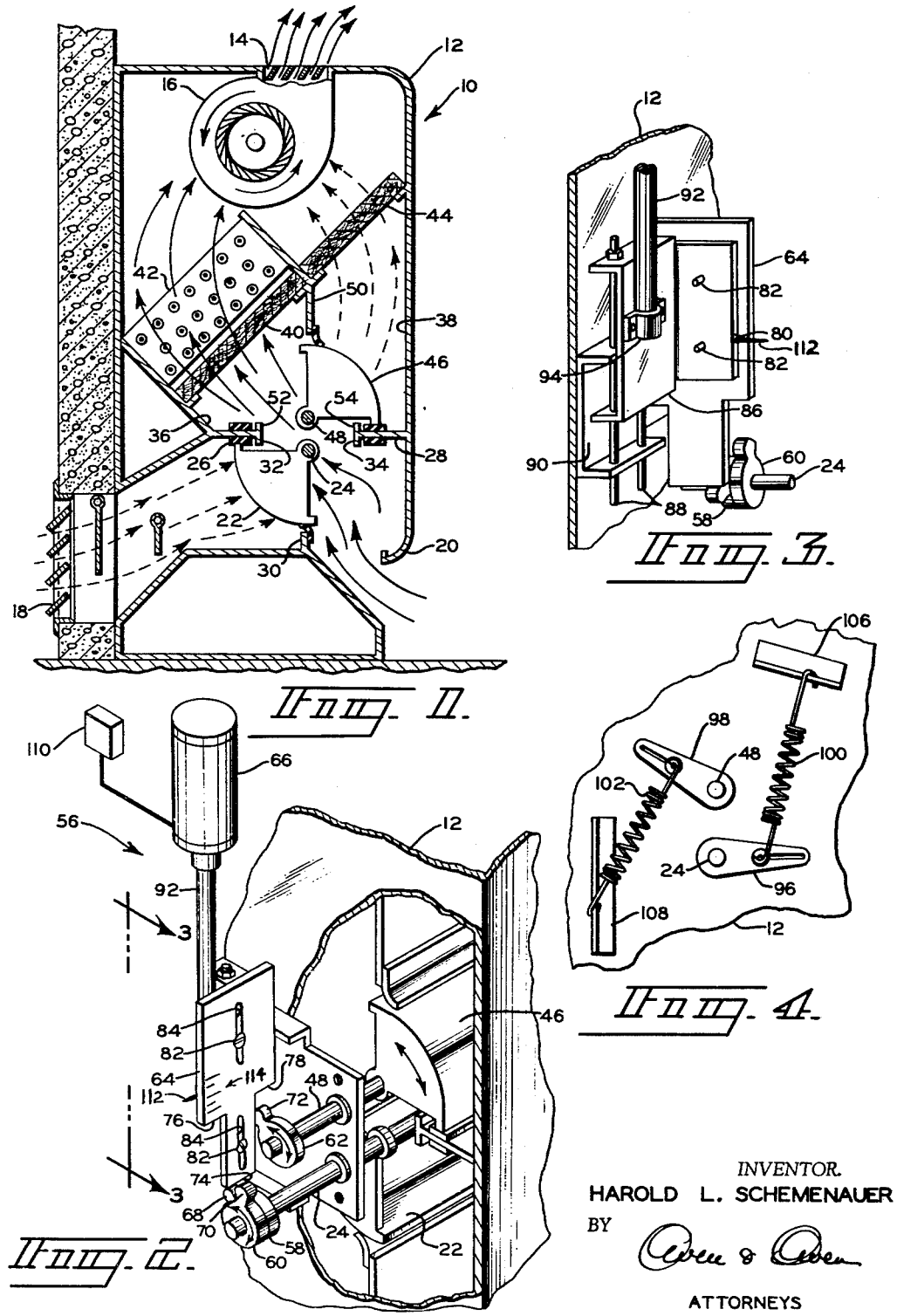
INVENTOR.
HAROLD L. SCHEMENAUER
BY
ATTORNEYS

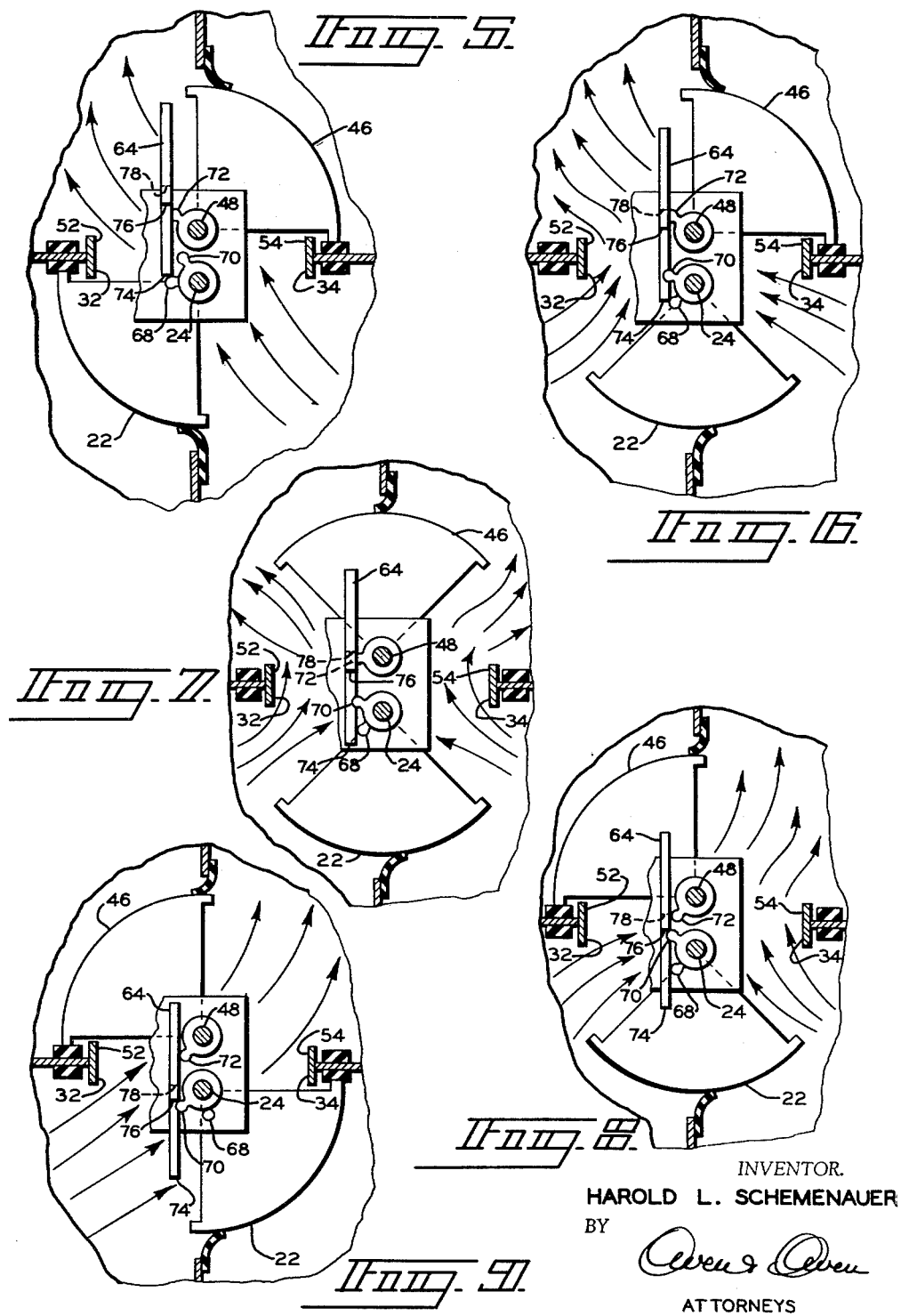

United States Patent Office 3,139,020
Patented June 30, 1964

3,139,020
AIR CONDITIONING UNIT AND CONTROL
MECHANISM THEREFOR
Harold L. Schemenauer, 577 South St., Holland, Ohio
Filed Apr. 26, 1961, Ser. No. 105,655
5 Claims. (Cl. 98—38)

This invention relates to an improved heating, ventilating and air conditioning unit and more particularly to an inexpensive, simplified, mechanical control for such a unit.

In order to properly air condition buildings and particularly public buildings having high occupancy loads, such as schools, close control of both outside air and recirculated air is of primary importance. The accuracy of the metering of these air volumes has a direct bearing on the control established for ventilating, heating, and cooling the air in the building, and also affects efficiency of the conditioning system from the standpoint of economy.

In conditioning units for buildings, particularly of the type described above, a heating or cooling coil is usually employed along with a by-pass chamber. By regulating the relative volume of air passing through the by-pass chamber, an effective means of controlling temperature within the building is provided when the coil is maintained at a constant temperature, as is usually the case. Such units also have controls for establishing the ratio of recirculated air to outside air being brought into the unit.

While there are many known ways for controlling airflow through the by-pass chamber and the ratio of recirculated air to outside air, such controls are very elaborate and expensive, and their complexity often results in high maintenance costs.

The present invention is concerned with an air conditioning unit and particularly a simplified and yet accurate control therefor which provides accurate metering of the air volumes over the entire range of ratios thereof. The new control mechanism employs simple cams connected to air-control dampers, which cams are controlled by a simple cam plate moved in a lineal path to contact and rotate the cams. The movement of the cam plate itself can be regulated by the use of low cost, standard controls.

It is, therefore, a principal object of the invention to provide an improved air conditioning unit and control therefor.

Another object of the invention is to provide improved controls for an air conditioning unit which are simplified and less expensive than presently known controls.

Still another object of the invention is to provide improved controls for an air conditioning system which will accurately meter the air passed therethrough and closely control the ratio of indoor, outdoor and by-pass air.

Other objects and advantages of the invention will be apparent from the following detailed description of a preferred embodiment thereof, reference being made to the accompanying drawings, in which:

FIG. 1 is a somewhat schematic view in vertical cross section of an air conditioning unit embodying the invention;

FIG. 2 is a view in perspective, with parts broken away and with parts in cross section, of a control mechanism for the air conditioning unit, a fragmentary portion of which is shown;

FIG. 3 is a rear view in perspective of a portion of the control shown in FIG. 2 and a portion of a housing for the air conditioning unit;

FIG. 4 is a fragmentary view of a preferred form of means to bias the shafts of air control dampers employed in the unit; and FIGS. 5-9 are somewhat schematic views in elevation of the operating part of the control mechanism and the dampers operated thereby, with the control mechanism and dampers shown in sequential positions.

Referring to the drawings, and more particularly to FIG. 1, an air conditioning unit according to the invention is indicated at 10 and includes a housing 12 having an opening 14 at the top thereof to which is connected a blower 16. The blower 16 draws air through the unit 10 either through a louvered outside opening 18, an inside opening 20, or both. The ratio of inside to outside air is controlled by a lower drum-type damper 22 which is affixed to a shaft 24 and is thus rotatably carried by the housing 12. The damper 22 can rotate through an angle of approximately 90°, between a position shown in FIG. 1 with the damper 22 in contact with a first horizontal partition 26 and another position in which it is in contact with a second horizontal partition 28. In either of these positions, or in any position therebetween, the damper contacts a vertical partition 30, the three partitions 26, 28, and 30 forming an inner outside air opening 32 and an inner inside air opening 34.

The air drawn through the housing 12 by the blower 16 can be directed through either a temperature control passage 36 or by a by-pass passage 38. Air drawn through the temperature control passage 36 passes through a filter 40 and a suitable coil 42 through which either heated or cooled fluid can be passed to heat or cool the air. Air passing through the by-pass chamber 38 is drawn through a filter 44 and does not undergo any temperature change. Flow through the passages 36 and 38 is controlled by an upper drum-type damper 46 mounted on a shaft 48 which is rotatably supported by the housing 12. The damper 46 can rotate through an arc of approximately 90° as limited by the horizontal partitions 26 and 28 which, together with an upper vertical partition 50, form a temperature-control opening 52 and a by-pass opening 54. The dampers 22 and 46 can, when in their extreme positions, close off the openings 32, 34, 52, and 54 entirely, with the aid of suitable resilient sealing strips, as is known in the art.

The lower damper 22 can control the ratio of inside to outside air flowing through the housing 12 and can limit this air to all inside air or to all outside air. The upper damper 46 can then direct the air in any proportions through the temperature control passage 36 or the by-pass passage 38 or can direct the flow of air entirely through one of the passages or the other.

Referring more particularly to FIGS. 2 and 3, a control mechanism 56 for the dampers 22 and 46 includes cam members 58 and 60 for the lower damper 22, a cam member 62 for the upper damper 46, a cam-operating plate 64 and a drive unit 66 therefor. The cam members 58 and 60 for the lower damper 22 are affixed to the lower damper shaft 24 by setscrews (not shown) or the like so that the cam members 58 and 60 can be loosened and rotated on the shaft 24, if desired, to change positions of their cam projections 68 and 70. The purpose of this adjustment will be apparent subsequently. The upper cam member 62 is affixed to the upper damper shaft 48 by a setscrew or the like so that it, too, can be loosened and adjusted on the shaft 48 to reposition its projection 72. The cam plate 64 includes a first edge 74 which is vertically aligned with the cam member 58, a second edge 76 which is aligned with the cam member 60, and a third edge 78 which is vertically aligned with the cam member 62. As the cam plate 64 moves in a lineal vertical path, the various edges 74, 76 and 78 strike the projections 68, 70 and 72 to cause the cam members 58, 60 and 62 to rotate the shafts 24 and 48.

The cam plate 64 is attached to a supporting plate 80 (FIG. 3) by means of screws 82 which extend through slots 84 (FIG. 2) to enable the plate 64 to be adjusted vertically with respect to the drive mechanism. The plate 80 is fastened to or is an integral part of a guide block 86 which is mounted on a pair of guide rods 88 which, in turn, are slidably held in a C-shaped channel 90. The channel 90, the rods 88, and the guide block 86 assure that the plate 64 remains in a planar, vertical path as it moves upwardly and downwardly. Movement of the plate 64 is established by means of a drive rod 92 which is fastened to the guide block 86 by a bracket 94 and is operatively connected to the drive means or motor 66.

While the dampers 22 and 46 are rotated in a counterclockwise direction by the action of the cam plate 64 on the cam members 58, 60 and 62, they must be driven in the opposite direction when the plate 64 is raised. One suitable means for accomplishing this is shown in FIG. 4. As there shown, the shafts 24 and 48 of the lower and upper dampers 22 and 46 may have levers 96 and 98 fastened to the ends opposite the ends to which the cam members are affixed. The levers 96 and 98 have springs 100 and 102 attached thereto which, in turn, are attached to ears 106 and 108 affixed to the housing 12. When the dampers 22 and 46 are rotated by the cam members and the cam plate, the levers 96 and 98 will be moved in a clockwise direction, as shown in FIG. 4, and the springs 100 and 102 will be placed in tension. When the plate 64 is raised above the cam members, the springs 100 and 102 will thereupon act upon the levers 96 and 98 and cause the dampers 22 and 46 to move toward their prior positions.

A typical operating control pattern made possible by the control mechanism 56 will now be discussed, reference being made to FIGS. 5-9. In FIG. 5, the cam plate 64 and the cam projections 68, 70 and 72, as well as the dampers 22 and 46, are in the same positions as shown in FIGS. 1 and 2. At this point, the cam plate 64 has not yet commenced moving downwardly and has not yet moved any of the projections 68-72. Thus, the biasing springs 100 and 102, or suitable counterweights or other shaft-restoring means, urge the dampers 22 and 46 to the positions shown in FIG. 5, in which positions all air passing through the unit 10 is recirculated or inside air and all of it is passing through the coil 42. As the cam plate is moved downwardly, the lower, intermediate edge 74 thereof first contacts the projections 68 and moves it in a counterclockwise direction, thus moving the shaft 24 and the lower damper 22 in a counterclockwise direction, causing the damper to move towards the position shown in FIGS. 6-8. Once the damper reaches this predetermined position, the projection 68 will not be moved downwardly any more no matter how much the cam plate 64 continues to be moved downwardly because, at this point, the projection 68 merely slides along the side of the cam plate 64. When the projection 68 reaches the lower position, the damper 22 will be, as shown, approximately half way between the openings 32 and 34 and will thus allow 50% return air and 50% outside air to enter the unit 10. This percentage of return and outside air can be regulated simply by loosening the setscrews of the cam member 58 and rotating the cam member 58 on the shaft 24. The more the cam member 58 is moved in a clockwise direction on the shaft 24, the farther open will be the damper 22 when the projection 68 and the cam plate 64 reach the limiting position shown in FIGS. 6-8, and vice versa.

In the position of the parts shown in FIG. 6, the projection 72 has not yet been contacted by the edge 78 of the cam plate 64 so that the upper damper 46 remains in the same position that it was in before any movement of the cam plate, as shown in FIG. 5. Thus, the return and outside air are still all directed through the coil 42.

When the cam plate 64 moves further downwardly, as, for example, when room temperature as measured by an electrical control 110 has reached a desired point, the projection 72 will be contacted and moved downwardly by the edge 78 of the cam plate 64 so as to move the shaft 48 and the damper 46 in a counterclockwise direction, as shown in FIG. 7. In this position, approximately 50% of the return and outside air will be delivered through the coil 42 and approximately 50% will be delivered through the by-pass passage 38.

When a further reduction of heat is called for, for example, the cam plate 64 will be moved downwardly still farther, causing the cam member 72, the shaft 48, and the damper 46 to rotate still farther in a counterclockwise direction to the position shown in FIG. 8. In this position all of the return and outside air is directed through the by-pass passage 38 so that its temperature is not changed by the coil 42 but yet some fresh, filtered air can be supplied to the building. When the damper 46 has reached the position of FIG. 8, the projection 72 will lie alongside the plate 64 but will not be moved downwardly any farther. However, further downward movement of the plate 64 will cause the edge 76 of the cam plate 64 to move downwardly the projection 70 of the cam member 60 which will then cause the lower damper 22 to again move in a counterclockwise direction until it fully closes the opening 34. In this position, the cam plate 64 has reached the bottom of its vertical path and all of the air will be outside air and all of it will pass through the by-pass passage 38.

When the plate 64 is again moved upwardly, the dampers 22 and 46 will again move in the opposite order, being moved by the springs 100 and 102 as the cam plate 64 is raised.

The position of the cam member 58 on the shaft 24 can be adjusted to determine the ratio of return to outside air when the cam plate 64 is in the positions shown in FIGS. 6-8. By moving the cam 58 clockwise on the shaft 24, the ratio will be lower, because the damper 22 will be rotated further in a counterclockwise direction from the position of FIGS. 6-8. By moving the cam 58 counterclockwise, the ratio will be higher. The cam plate 64 is then adjusted so that the edge 74 is in contact with the projection 68 to move the damper 22 immediately when the plate 64 begins to move downwardly.

In practice, the plate 64 is first adjusted by loosening the screws 82 and moving the plate 64 until a pointer 112 attached to the plate 80 is opposite a desired setting on a scale indicated at 114 on the plate 64. The projection 68 on the cam 58 is then moved into contact with the edge 74 which automatically adjusts the damper 22 to obtain the desired ratio of return to outside air when the cam 58 is in the dwell position shown in FIGS. 6-8. To attain 100% outside air when the plate 64 is in the lowest position, as shown in FIG. 9, the cam 60 is always angularly spaced 90° from the cam 58. No adjustment of the cam 62 is necessary when the cams 58 and 60 are rotated because the edge 78 of the cam plate 64 will still contact and begin to move the projection 72 when the cam 58 reaches its dwell position.

While the limiting positions of all of the cams and their associated dampers have been explained, it should be understood that an almost infinite number of intermediate positions of the dampers may be obtained. It is also to be understood that the particular sequence of operation described above is only for purposes of illustration and not limitation. By using additional cam members and projections and additional contacting edges or even slots in the cam plate 64, many different damper positions can be established for a given position or movement of the cam plate 64.

The center of the circle defining the projection 72 lies in the line of movement of the cam operating plate 64, and the radius of the circle is chosen to given equal angular displacement of the cam body 62 with equal linear displacement of the operating plate 64, the point of contact between the circular surface of the projection and its driving plate shifting first inwardly toward the center of rotation of cam 62 and then outwardly as the center of the circular projection passes a horizontal plane.

The particular shape of the cams, and particularly the cam member 62 and the cam projection 72, enables the damper 46 to be very closely controlled during linear movement of the cam-operating plate 64. As shown in the drawings, the cam projection 72 is generally of circular shape, except for the portion which is structurally integral with the cam member 62. Thus, the particular shape allows the linear movement of the cam-operating plate 64 to rotate the cam 62 and shaft 48 uniformly relative to movement of the plate, and thereby moves the damper 46 uniformly and substantially directly proportionally to the movement of the plate 64. The shapes of the cam projections 68, 70 and 72 are alike and all of them enable similarly close control to be obtained over the movement of the dampers 22 and 46. Further, movements of the damper 22 relative to the damper 46 can also be closely controlled and the two dampers closely coordinated.

Although many other shapes of the cam projections can be used to convert the linear movement of the cam plate into a circular motion of the damper in a substantially straight-line functional relationship, the particular contour embodied in the invention enables such to be accomplished along with a 90° circular motion of the damper 46 with only a 1⅛ inch linear stroke of the cam-operating plate 64. Further, this is accomplished with very little torque required to be transmitted to the damper shafts so that relatively small drive motors can be employed.

By way of further illustration, but not limitation, a specific example of an application for the air conditioning unit 10 will be described. In the instance of a school building, the classrooms are generally allowed to cool during the night, perhaps to a temperature of 40°–50° F. When it is desired to bring the temperature of the rooms up to a comfortable level, for example, 70° F., the next morning, the unit 10 is turned on with the blower 16 operated and with heating fluid passed through the heating coil 42. In this instance, all air to the unit 10 is relatively warm, return air from within the building and all of it is passed through the heating coil 42. This condition remains the same until the room temperature, as measured by the thermostat or control 110, reaches 68°, for example. At this time, the drive unit 66 moves the cam plate 64 downwardly a predetermined amount, specifically to the position shown in FIG. 6, with the return air being reduced and with fresh or outside air being added, but with all the air still being supplied through the heating coil 42. From this point on, during normal operation of the unit 10, all air supplied to the unit 10 consists of return air and fresh air in the ratio determined by the position of the damper 22. As previously set forth, the position of the damper 22 is regulated by the position of the plate 64 and the cam 58, which can be set by means of the scale 114.

As the temperature increases from 68° F. to 72° F., for example, the upper damper 46 moves from the position of FIG. 6 through the position of FIG. 7 and, finally, to the position of FIG. 8 as the drive unit 66 moves the plate 64 lower. This movement of the damper 46 changes the direction of the air from being entirely through the heating coil 42 to being entirely through the by-pass duct 38. Almost all operation of the unit 10 will be with the damper 22 in the position shown in FIGS. 6–8 and with the damper 46 varying between the positions of FIG. 6 and FIG. 8. This provides more even heating because proportional control is employed rather than on-off control. In addition, a constant volume of air is constantly circulated through the classrooms and the ratio of the return and fresh air remains constant.

If, during the course of the day, outside temperature increases sufficiently, the temperature in the classrooms may exceed 72° even with the damper 46 in the position of FIG. 8, with all of the air going through the by-pass duct 38. If the temperature exceeds 72° F., the drive unit 66 causes the cam plate 64 to move to its lowest position, as shown in FIG. 9, and thereby cause the damper 22 to move to its extreme counterclockwise position so that all of the air passing through the by-pass duct 38 is fresh air.

While many types of drive units 66 can be employed, one which has been found to be particularly effective is a pneumatic motor of the spring-loaded type which moves the rod 92 a predetermined distance against a built-in spring, according to the pressure applied to the unit 66. This pressure is regulated by the thermostat 110.

Various other modifications of the above described embodiment of the invention will be apparent to those skilled in the art, and it is to be understood that such modifications can be made without departing from the scope of the invention, if within the spirit and tenor of the accompanying claims.

I claim:

1. In an air conditioning unit, a first damper, a first shaft on which said first damper is mounted, a second damper, a second shaft on which said second damper is mounted, a first cam member on said first shaft to one side of said first damper for turning said first shaft when said cam member is turned, two angularly displaced cam members on said second shaft for turning said second shaft when either of said two angularly disposed cam members is turned, a cam plate movable in a path intersecting portions of all three cam members when said cam members are in predetermined positions, means for moving said plate in said path, means on plate for contacting and turning said cam members in a predetermined order to predetermined positions and to rotate said dampers in a predetermined order to predetermined positions.

2. In an air conditioning unit, a lower damper movable in an arc between two lower openings, a lower shaft for rotatably supporting said damper, an upper damper above said lower damper and movable in an arc between two upper openings, an upper shaft on which said upper damper is rotatably mounted, a first cam member on said upper shaft to one side of said upper damper for turning said upper shaft and said upper damper when said first cam member is turned, two angularly displaced cam members on said lower shaft spaced apart on said lower shaft from each other and from said first cam member, said two angularly displaced cam members causing said lower shaft and said lower damper to turn when either of said angularly displaced cam members is turned a cam plate, means for moving said cam plate in a path intersecting all three of said cam members when in predetermined positions, means on plate for individually contacting and moving each of said cam members in a predetermined order to predetermined positions and to move said dampers in a predetermined order to predetermined positions.

3. A unit according to claim 2 characterized by means enabling said cam members to be rotatably adjustable on their respective shafts.

4. A unit according to claim 2 wherein the means on said cam plate for contacting said cam members are arranged so that one of the angularly disposed cam members for the lower damper will be first contacted and caused to move the lower damper to a predetermined position, the cam for the upper damper will be contacted secondly and will be moved through an arc from a position substantially closing one of its upper openings to a position substantially closing the other of the upper openings, and thirdly the other of the angularly disposed cam members for the lower damper will be contacted to cause the lower damper to continue moving in the same direction in which it was originally moved.

5. A unit according to claim 2 wherein said cam members include cam projections of generally circular contour lying in the path of said cam plate to move their associated dampers with a rotary motion which is uniform and proportional to the motion of said cam plate.

References Cited in the file of this patent

UNITED STATES PATENTS

| | | |
|---|---|---|
| 1,084,514 | Whitlock | Jan. 13, 1914 |
| 1,896,774 | Gebhardt | Feb. 7, 1933 |
| 1,990,895 | Callahan | Feb. 12, 1935 |
| 2,220,355 | Shurtleff | Nov. 5, 1940 |
| 2,293,065 | Kiczales | Aug. 18, 1942 |
| 2,828,110 | Baker et al. | Mar. 25, 1958 |
| 2,971,450 | Millman | Feb. 14, 1961 |